(12) United States Patent
Muller et al.

(10) Patent No.: US 9,092,631 B2
(45) Date of Patent: Jul. 28, 2015

(54) COMPUTER-IMPLEMENTED SECURITY EVALUATION METHODS, SECURITY EVALUATION SYSTEMS, AND ARTICLES OF MANUFACTURE

(71) Applicants: Battelle Memorial Institute, Richland, WA (US); Bradley Robert Key, Albuquerque, NM (US)

(72) Inventors: George Muller, Richland, WA (US); Casey J. Perkins, West Richland, WA (US); Mary J. Lancaster, Richland, WA (US); Douglas G. MacDonald, West Richland, WA (US); Samuel L. Clements, Richland, WA (US); William J. Hutton, Kennewick, WA (US); Scott W. Patrick, Kennewick, WA (US); Bradley Robert Key, Albuquerque, NM (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 14/055,776

(22) Filed: Oct. 16, 2013

(65) Prior Publication Data
US 2015/0106941 A1 Apr. 16, 2015

(51) Int. Cl.
*G06F 21/00* (2013.01)
*G06F 21/57* (2013.01)
*H04L 29/06* (2006.01)

(52) U.S. Cl.
CPC .......... *G06F 21/577* (2013.01); *H04L 63/1433* (2013.01)

(58) Field of Classification Search
USPC .......................................................... 726/25
See application file for complete search history.

(56) References Cited

U.S. PATENT DOCUMENTS

| 8,272,061 | B1* | 9/2012 | Lotem et al. ................ 726/25 |
| 8,407,798 | B1* | 3/2013 | Lotem et al. ................ 726/25 |
| 8,433,768 | B1* | 4/2013 | Bush et al. ................ 709/207 |
| 8,621,552 | B1* | 12/2013 | Lotem et al. ................. 726/1 |
| 2005/0193430 | A1* | 9/2005 | Cohen et al. ................ 726/25 |
| 2009/0077666 | A1* | 3/2009 | Chen et al. ................ 726/25 |
| 2009/0271863 | A1* | 10/2009 | Govindavajhala et al. ..... 726/23 |

(Continued)

OTHER PUBLICATIONS

Ingols, et al., "Modeling Modern Network Attacks and Countermeasures Using Attack Graphs", 2009 IEEE Annual Computer Security Applications Conference, United States, pp. 117-126.

(Continued)

*Primary Examiner* — Morshed Mehedi
(74) *Attorney, Agent, or Firm* — Wells St. John P.S.

(57) ABSTRACT

Computer-implemented security evaluation methods, security evaluation systems, and articles of manufacture are described. According to one aspect, a computer-implemented security evaluation method includes accessing information regarding a physical architecture and a cyber architecture of a facility, building a model of the facility comprising a plurality of physical areas of the physical architecture, a plurality of cyber areas of the cyber architecture, and a plurality of pathways between the physical areas and the cyber areas, identifying a target within the facility, executing the model a plurality of times to simulate a plurality of attacks against the target by an adversary traversing at least one of the areas in the physical domain and at least one of the areas in the cyber domain, and using results of the executing, providing information regarding a security risk of the facility with respect to the target.

21 Claims, 4 Drawing Sheets

(56) References Cited

U.S. PATENT DOCUMENTS

| | | | |
|---|---|---|---|
| 2010/0138925 A1* | 6/2010 | Barai et al. | 726/25 |
| 2012/0180133 A1* | 7/2012 | Al-Harbi et al. | 726/25 |
| 2012/0198514 A1* | 8/2012 | McCune et al. | 726/1 |
| 2013/0151229 A1* | 6/2013 | Braman et al. | 703/22 |
| 2013/0174246 A1* | 7/2013 | Schrecker et al. | 726/14 |
| 2013/0347116 A1* | 12/2013 | Flores et al. | 726/25 |
| 2014/0007241 A1* | 1/2014 | Gula et al. | 726/25 |
| 2014/0137257 A1* | 5/2014 | Martinez et al. | 726/25 |

OTHER PUBLICATIONS

Jordan, et al., "Discrete-Event Simulation for the Design and Evaluation of Physical Protection Systems", 1998 Winter Simulation Conference, United States, pp. 899-905.

Kuhl, et al., "Cyber Attack Modeling and Stimulation for Network Security Analysis", 2007 IEEE Winter Simulation Conference, United States, pp. 1180-1186.

MacDonald et al., "Cyber/Physical Security Vulnerability Assessment Integration", IEEE, Pacific Northwest National Laboratory, Feb. 24, 2013, United States, 6 pages.

Mo, et al., "Quantitative Assessment of Cyber Security Risk using Bayesian Network-Based Model", 2009 IEEE Systems and Information Engineering Design Symposium, United States, pp. 183-187.

Sommestad et al., "Cyber Security Risks Assessment with Bayesian Defense Graphs and Architectural Models", 2009, 42nd Hawaii International Conference on System Sciences, United States, pp. 1-10.

* cited by examiner

COMPUTER-IMPLEMENTED SECURITY EVALUATION METHODS, SECURITY EVALUATION SYSTEMS, AND ARTICLES OF MANUFACTURE

STATEMENT AS TO RIGHTS TO INVENTIONS MADE UNDER FEDERALLY-SPONSORED RESEARCH AND DEVELOPMENT

This invention was made with Government support under Contract DE-AC0576RLO1830 awarded by the U.S. Department of Energy. The Government has certain rights in the invention.

TECHNICAL FIELD

This disclosure relates to computer-implemented security evaluation methods, security evaluation systems, and articles of manufacture.

BACKGROUND OF THE DISCLOSURE

Aspects of the disclosure are directed to identifying and evaluating security risks of infrastructure facilities. Numerous facilities, such as corporation offices, factories, plants, etc. may contain numerous assets which need to be secured and protected. Accordingly, the facilities have various security systems intended to detect unauthorized intrusions and delay an adversaries' attempt to access the assets. With the emergence of computer systems and communications systems, modern protection is not only limited to physical protection but also extends into the cyber domain, for example, through the use of passwords, firewalls, etc. Furthermore, there is overlap between physical and cyber domains as an adversary may use vulnerabilities in one domain to render security systems in the other domain less secure. In one illustrative example, an adversary may launch an initial attack upon cyber infrastructure to reduce the protection provided by security systems in the physical domain (e.g., access a server or cyber control system to unlock a physical door).

At least some aspects of the disclosure are directed towards methods and apparatus to evaluate security systems of a facility as discussed in detail below.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

Figure 1:
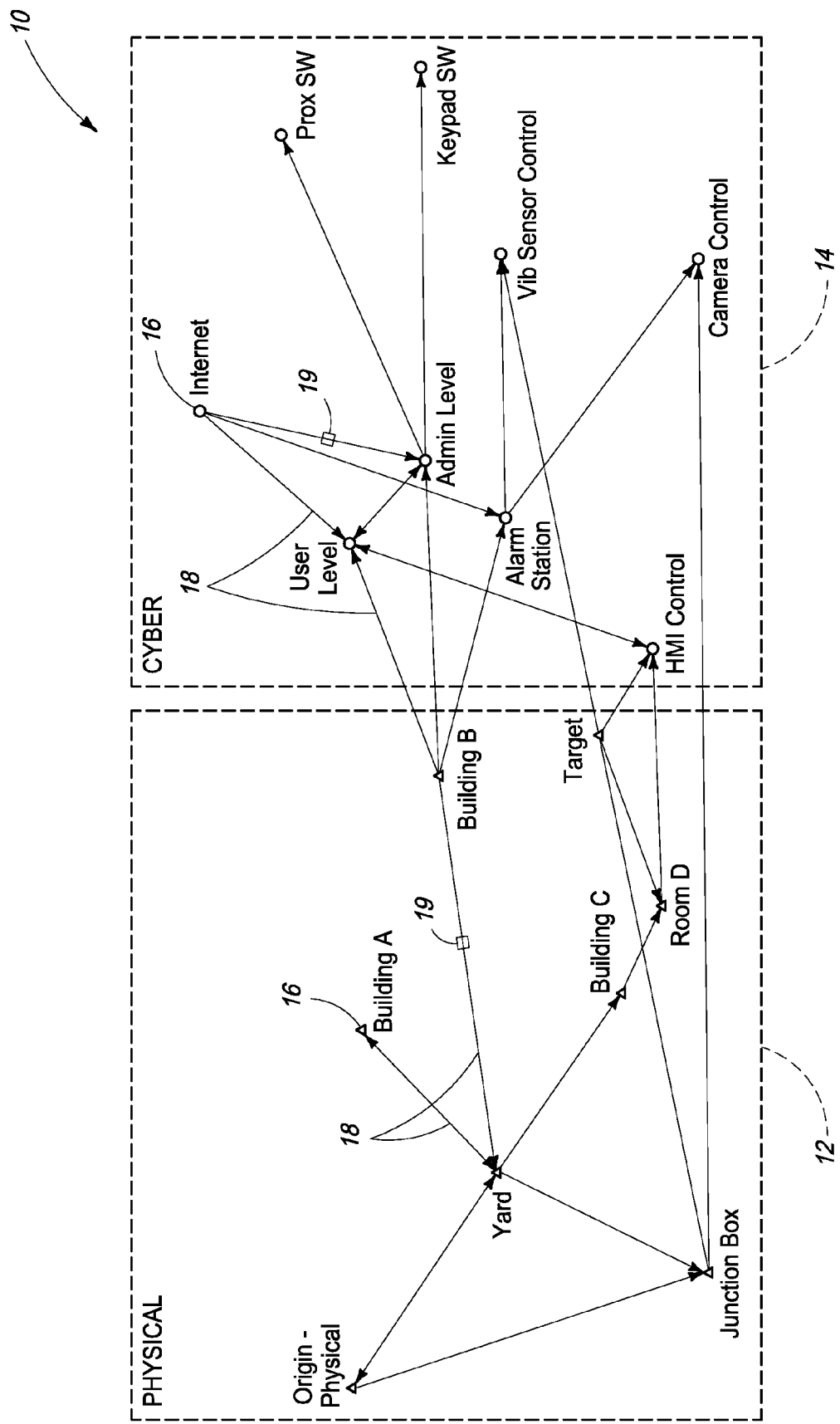
FIG. 1 is an illustrative representation of a facility being modeled according to one embodiment.

Referring to FIG. 1, a graphical representation of a facility 10 is shown according to one embodiment. As described in detail below, the facility 10 is modeled and analyzed to evaluate security risks with respect to one or more targets within the facility 10. The example facility 10 may be a business, enterprise, building, industrial plant, electrical substation, office, etc. or other structures or group of structures which may include one or more targets, such as assets of interest or value to others, and which are protected. At least some aspects of the disclosure are directed towards analysis of security risks of the facility 10 with respect to attacks or intrusions upon one or more targets of the facility.

In the illustrated embodiment, facility 10 includes areas, pathways and safeguards in both of a physical domain 12 and a cyber domain 14. For example, a plurality of nodes 16 represent areas, a plurality of arcs 18 intermediate the nodes 16 represent pathways, and a plurality of safeguards 19 are provided upon at least some of the arcs 18.

Areas are identified and modeled on the basis that they either offer the adversary an opportunity to alter a state of the system or provide access to additional areas. Example areas in the physical domain include buildings, rooms, specific open spaces, panel boxes, etc. and example areas in the cyber domain may be access-oriented definitions, such as a network permission or zone and may include the Internet, a DMZ, intranet, extranet, servers, workstations, network devices, mobile devices, etc. Pathways may be physical or electronic connections between the areas.

In one embodiment, the areas, pathways and safeguards of the facility 10 may be modeled and utilized to simulate attacks of an adversary upon a target of the facility. In one embodiment, example targets include a control panel, firewall, server, electrical switch of a substation, or other asset of interest and which may be possibly removed from the facility or sabotaged. System refers to the cyber and physical architecture of the facility 10 being modeled in the described embodiments. The cyber and physical portions of the system are modeled as connected graphs with the nodes 16 and arcs 18 in the embodiment shown in FIG. 1.

Figure 2:
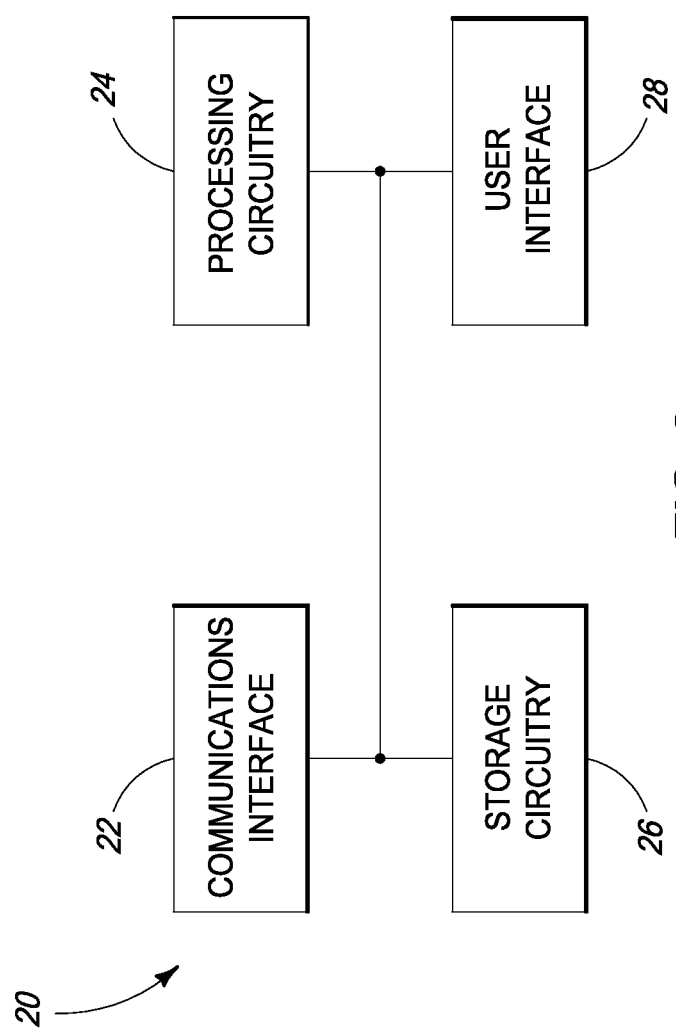
FIG. 2 is a functional block diagram of a computing system according to one embodiment.

Referring to FIG. 2, one embodiment of a computing system 20 of a security evaluation system is shown. Computing system 20 is configured to implement integrated vulnerability assessment of a facility 10 in both physical and cyber domains in one embodiment. In the illustrated example embodiment, computing system 20 includes a communications interface 22, processing circuitry 24, storage circuitry 26, and a user interface 28. Other embodiments of computing system 20 are possible including more, less and/or alternative components.

Communications interface 22 is arranged to implement communications of computing system 20 with respect to both internal and external devices while providing communication among components of the computing system 20. Communications interface 22 may be arranged to communicate information bi-directionally with respect to computing system 20. Communications interface 22 may be implemented as a network interface card (NIC), serial or parallel connection, USB port, Firewire interface, flash memory interface, or any other suitable arrangement for implementing communications with respect to computing system 20.

In one embodiment, processing circuitry 24 is arranged to access information regarding a facility, build a model of the facility and execute the model to provide information regarding a security risk of a facility. Processing circuitry 24 is further configured to process and analyze data, control data access and storage, issue commands, and control other desired operations including display of a graphical user interface via user interface 28.

Processing circuitry 24 may comprise circuitry configured to implement desired programming provided by appropriate computer-readable storage media in at least one embodiment.

For example, the processing circuitry 24 may be implemented as one or more processor(s) and/or other structure configured to execute executable instructions including, for example, software and/or firmware instructions. A plurality of processors may operate in parallel in some distributed parallel processing implementations. Other example embodiments of processing circuitry 24 include hardware logic, programmable gate array (PGA), field programmable gate array (FPGA), application specific integrated circuit (ASIC), state machines, and/or other structures alone or in combination with one or more processor(s). These examples of processing circuitry 24 are for illustration and other configurations are possible. Additional details regarding example configurations which are configured to process large-scale data sets are described below.

Storage circuitry 26 is configured to store programs such as executable code or instructions (e.g., software and/or firmware), electronic data, databases, a metadata repository, or other digital information and may include computer-readable storage media. In one embodiment, storage circuitry 26 may store information regarding a facility to be modeled as well as the model itself and results of executions of the model. A plurality of storage components may operate in parallel in some embodiments. At least some embodiments or aspects described herein may be implemented using programming stored within one or more computer-readable storage medium of storage circuitry 26 and configured to control appropriate processing circuitry 24.

The computer-readable storage medium may be embodied in one or more articles of manufacture which can contain, store, or maintain programming, data and/or digital information for use by or in connection with an instruction execution system including processing circuitry 24 in one embodiment. For example, computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

User interface 28 is configured to interact with a user including conveying data to a user (e.g., displaying visual images, graphs, processing results, etc. for observation by the user) as well as receiving inputs from the user, for example, defining the physical and cyber architectures of a facility to be analyzed, adjusting variable parameters of a model, or interacting with results of execution of the model in one embodiment.

As described further below, the computing system 20 may be utilized to build a model of facility 10 and then analyze the model to evaluate vulnerabilities of a target within the facility 10 to attack in both the physical and cyber domains and provide information regarding a security risk to the target using results of the analysis.

Referring again to FIG. 1, the computing system 20 accesses or receives various inputs regarding a configuration of a facility (e.g., user inputs, an inputted electronic file, or by other appropriate methods). Example inputs used to perform a security risk analysis include system inputs, scenario inputs, and run-time inputs which are described in additional detail below.

Initially, system inputs are discussed and correspond to the layout or site of the facility (e.g., physical and cyber infrastructures) being modeled. For example, the model includes connections between areas of the facility 10 in one embodiment. In one example, the connections between the areas may be represented in the form of a basic adjacency matrix of Table A where a '1' represents a connection between the two areas meaning an adversary can "move" along a respective pathway between the areas as the model is executed and the absence of a '1' indicates that the adversary cannot directly move between the two areas. The matrix can be asymmetrical where direction is important between areas since outbound network traffic may not have the same controls as inbound or exiting a building is not subject to the same safeguards as entering. The matrix may also include connections corresponding to pathways between physical areas and cyber areas.

TABLE A

|  |  | Origin 1 | Yard 2 | Junction Box 3 | Switchyard 4 | Maintenance Build 5 | Control Room 6 | Operations Control 7 | Target 8 | Internet 9 |
|---|---|---|---|---|---|---|---|---|---|---|
| Origin | 1 |  |  | 1 | 1 |  |  |  |  |  |
| Yard | 2 | 1 |  |  | 1 | 1 | 1 | 1 |  |  |
| Junction Box | 3 |  | 1 |  |  |  |  |  |  |  |
| Switchyard | 4 |  | 1 |  |  |  |  |  |  |  |
| Maintenance Building | 5 |  | 1 |  |  |  |  |  |  |  |
| Control Room | 6 |  | 1 |  |  |  |  | 1 |  |  |
| Operations Control | 7 |  | 1 |  |  |  | 1 |  | 1 |  |
| Target | 8 |  |  |  |  |  | 1 |  |  |  |
| Internet | 9 |  |  |  |  |  |  |  |  |  |
| User Level | 10 |  |  |  |  |  |  |  |  | 1 |
| Admin Level | 11 |  |  |  |  |  |  |  |  | 1 |
| Keypad SW | 12 |  |  |  |  |  |  |  |  |  |
| Prox SW | 13 |  |  |  |  |  |  |  |  |  |
| Alarm Station | 14 |  |  |  |  |  |  |  |  | 1 |

TABLE A-continued

| | |
|---|---|
| Camera Control | 15 |
| Sensor Control | 16 |
| HMI Control | 17 |

| | | User Level 10 | Admin Level 11 | Keypad SW 12 | Prox SW 13 | Alarm Station 14 | Camera Control 15 | Sensor Control 16 | HMI Control 17 |
|---|---|---|---|---|---|---|---|---|---|
| Origin | 1 | | | | | | | | |
| Yard | 2 | | | | | | | | |
| Junction Box | 3 | | | | | | | | |
| Switchyard | 4 | | | | | | | | |
| Maintenance Building | 5 | 1 | 1 | | | 1 | | | |
| Control Room | 6 | | | | | | | | |
| Operations Control | 7 | | | | | | | | | 1 |
| Target | 8 | | | | | | | | |
| Internet | 9 | 1 | 1 | | | 1 | | | |
| User Level | 10 | | 1 | | | | | | 1 |
| Admin Level | 11 | 1 | | 1 | 1 | | | | |
| Keypad SW | 12 | | 1 | | | | | | |
| Prox SW | 13 | | 1 | | | | | | |
| Alarm Station | 14 | | | | | | 1 | 1 | |
| Camera Control | 15 | | | | | 1 | | | |
| Sensor Control | 16 | | | | | 1 | | | |
| HMI Control | 17 | | | | | | | | |

In one embodiment, each area is defined as either a hub or leaf. A hub is an area that has more than one area connection, and a leaf is an area that has only one area connection. This designation is used in some implementations to help keep the adversary from repeatedly visiting the same leaf nodes. Each possible connection on the adjacency matrix is a viable pathway that an adversary could traverse. Pathways are also the objects in the model to which safeguard sets are assigned. Pathways typically have at least one set of safeguards 19.

Safeguards 24 are the basic unit of delay (impediment to the adversary) and detection within the described embodiment of the model. General types of safeguards 19 may be identified and characterized for the system and include physical and cyber safeguards 19 in one embodiment. Instances of safeguards in the system may be modeled independently, allowing for isolated or system-wide changes in safeguard performance. By modelling safeguard performance based on adversary skill levels and allowing dynamic state changes, a great number of possible analyses can be generated using the same system definitions. Cyber and physical safeguards 19 may be parameterized as follows: SG ID (key) which is a unique identifier for each safeguard type, a safeguard description (string) which briefly describes the safeguard, delay (e.g., minutes as integer) which is the time that adversary will be delayed and depends on mode and skill levels of the adversary in cyber/physical domain as represented by one or more variable parameters including stealth (e.g., low, medium, high values), and speed (e.g., low, medium, high values).

In addition, cyber and physical safeguards 19 may be additionally modeled with one or more variable parameter of a detection probability, initial performance, and degrade performance. The detection probability parameter corresponds to the probability that adversary will be detected at each type of safeguard 19. In one embodiment, this parameter depends on mode and cyber/physical skill level of the adversary and example values provided for each safeguard type may be indicated as stealth (e.g., low, medium, high values) and speed (e.g., low, medium, high values).

The initial performance parameter corresponds to functionality of the safeguard at beginning of model run indicated as a percentage as real (0-100%) where 0% indicates safeguard would provide minimum delay (e.g., door unlocked) and/or detection of the adversary at model start and 100% indicates safeguard is operating at maximum delay and/or detection for that safeguard 19 (e.g., door locked).

The degrade performance parameter corresponds to the amount to decrement the performance of the safeguard when the safeguard is defeated (adversary moves beyond current safeguard) indicated as a percentage as real (0-100%) where a value of 100% would indicate that once adversary moves beyond safeguard, the performance would be completely degraded, to zero minutes delay and 0% detection probability for the remainder of an iteration, which may also be referred to as a replication, and is discussed in additional detail below.

Safeguard Table B represents example values for various types of safeguards 19 in one embodiment.

TABLE B

| | | Delay (min.) | | | | | | Detection Probability (%) | | | | | | Initial Performance Factor (0-1.00) | | Degrade Performance Factor (0-1.00) | | |
|---|---|---|---|---|---|---|---|---|---|---|---|---|---|---|---|---|---|---|
| | | Stealth | | | Speed | | | Stealth | | | Speed | | | | | | | |
| SG# | Safeguards | L | M | H | L | M | H | L | M | H | L | M | H | Delay | Detection | Delay | Detection | Cyber/Physical |
| 1 | None | 0 | 0 | 0 | 0 | 0 | 0 | 0 | 0 | 0 | 0 | 0 | 0 | 0 | 0 | 0 | 0 | None |
| 2 | Agent Based NAC | 6.00 | 3.00 | 1.00 | 3.00 | 1.50 | 0.50 | 0.25 | 0.15 | 0.05 | 0.25 | 0.15 | 0.05 | 1.00 | 1.00 | 1.00 | 1.00 | Cyber |
| 3 | Anti Virus | 6.00 | 3.00 | 1.00 | 3.00 | 1.50 | 0.50 | 0.25 | 0.15 | 0.05 | 0.25 | 0.15 | 0.05 | 1.00 | 1.00 | 1.00 | 1.00 | Cyber |
| 4 | Barrier Door | 1.50 | 1.00 | 1.00 | 1.50 | 0.50 | 0.50 | 0.00 | 0.00 | 0.00 | 0.00 | 0.00 | 0.00 | 1.00 | 1.00 | 1.00 | 1.00 | Physical |
| 5 | Barrier Exterior Wall | 10.00 | 10.00 | 10.00 | 10.00 | 2.00 | 2.00 | 0.00 | 0.00 | 0.00 | 0.00 | 0.00 | 0.00 | 1.00 | 1.00 | 1.00 | 1.00 | Physical |

Safeguard sets are used to model multiple safeguards existing on a single pathway. Each pathway has at least one safeguard set assigned to it in one embodiment. In cases where there are multiple means available to travel between areas, additional safeguard sets are used. For example, to get into a room of a facility (area 2) from the outside (area 1), there are two options in one example, through a first or second door. In this case, the pathway connecting area 1 to area 2 has two safeguard sets, one corresponding to each of the doors. Each of those safeguard sets is then, in turn, comprised of at least one safeguard in the described example. For each defined safeguard (e.g., a door), multiple instances may exist of it throughout the modeled facility. Each instance has a unique ID and attributes (delay and detection) for each are managed individually in one embodiment.

In one embodiment, there is the concept of an action to affect change within the system. Actions are assigned to areas, and once an adversary reaches an area, actions corresponding to that area are realized. Actions may be assigned to areas to facilitate system wide state changes and non-safeguard related delays. Upon entry into either cyber or physical areas, the adversary can perform pre-defined tasks. The tasks can be as simple as a time delay, or as complicated as degrading all instances of a particular safeguard type. One example would be the case where an adversary gains entry into an access control server, granting facility wide access to all password controlled locks. The action element provides a dynamic construct for modeling a variety of attack types.

Actions have four basic functions in one example: set next area (area ID) which dictates the next area the adversary will move to regardless of random/prescribed path method and which is input as an area ID; delay the adversary (time in minutes adversary will experience a delay at current location); affect specific safeguard (safeguard instance ID) which degrades delay by a percentage and/or detection by a percentage; and set specific objective as met (area ID).

As mentioned previously, scenario inputs are also specified and used to evaluate the system inputs for performance. For example, systems can be measured against a variety of adversary types with unique objective sets. Similarly the response can be altered as well. The following example variable parameters are listed below and define an analysis the system will be measured against in one embodiment.

In one embodiment, the model is constructed as a Monte Carlo discrete event simulation based on a timely detection methodology. The timely detection methodology is to provide detection as early as possible and build in sufficient delay to allow a response team the time needed to interrupt the chain of events before the adversary can make it to the target and complete the final task.

First, a physical response time is a countdown timer (variable time parameter) and is set as a predetermined length or unit of time (e.g., seconds, minutes, etc.) in the described example embodiment to implement the timely detection methodology. Once a detection event occurs, the timer begins and the adversary will be "caught" once time 0 is reached. If the adversary completes the mission (e.g., reaches the target) prior to time 0, the adversary is successful.

Accordingly, in one embodiment, the countdown timer may correspond to an estimated time for a response team to respond and neutralize the adversary following the detection. Facilities being modeled may have multiple detection points along a given pathway, but the goal is to detect them early enough and delay them long enough that the response team can neutralize the adversary in time. If the adversary is detected too late in the pathway, and the response time doesn't arrive in time, the adversary is considered to win the given iteration. The response time may be determined by performance testing and running drills at an existing facility in one embodiment.

Cyber response time is identical in function to physical response time, but is applicable to cyber detection events, and can be specified independent of the physical response time.

Different skill levels and modes of operation are additional variable parameters which may be independently assigned to each for each adversary entity participating in the analysis in one embodiment. For example, cyber and physical skill characteristics may be independently assigned (low, medium, or high) and determine the probability of detection and the amount of delay experienced at each safeguard (e.g., see Table B) for the respective adversary entity. In addition, adversaries may operate under one of two possible modes: stealth or speed. Delay and probability values for safeguards will depend on which mode the adversary is operating in. In the event of detection, adversary mode may be changed from stealth to speed. Initially, the adversary may choose to operate with stealth or speed as the primary mode. However, once in speed mode, an adversary will not switch back to stealth mode in one embodiment.

In one embodiment, an integrated mode parameter indicates which domains the adversary will operate in (single attack mode or blended). The options in one example are: physical only, cyber only and cyber/physical. The cyber/physical setting allows the adversary to move between cyber and physical areas and carry out an integrated attack, such as a physical enabled cyber attack or a cyber enabled physical attack. Single domain attacks are carried out by restricting the adversary to either only physical areas, or only cyber areas. Blended attacks in both physical and cyber attacks involve beginning in one domain to affect change in the other, and then backing outward to take advantage of reduced system effectiveness, before penetrating further into the defenses.

An object set parameter may also be specified which defines a set of objectives which each adversary must meet in order to succeed. Each objective is an area in the system network structure and the set contains at least one objective.

As mentioned above, run-time inputs are also specified for the model and used to evaluate the system inputs for performance in one embodiment. Example run-time settings define the number of iterations to run and which network traversal logic to use (predefined path or random path).

More specifically, network navigation model logic can be altered to affect how the adversary traverses the network of areas. Once an adversary reaches an area, they choose another area to go to next. Using a random traversal setting, the adversary will randomly select a connected area available to them at their current area (See the adjacency matrix of Table A). If more than one safeguard set is present, the adversary will then randomly select from the available safeguard sets on the appropriate pathway (connecting the current area to the next area). The cycle is repeated once the adversary reaches the next area. A prescribed path setting may also be used where a list of areas can be set into the model and the adversary traverses them in that order. The selection of safeguard sets on pathways, however, is still randomly selected from the available options for the prescribed pathways in one embodiment.

In addition, each area is indicated as either a leaf or hub as mentioned above. The random traversal method uses this information to restrict an adversary from traveling to a leaf hub multiple times in one implementation. This is accomplished by setting a visited leaf to "visited", and the adversary will not be able to select this area until a hub/leaf reset event occurs.

The number of iterations to run may also be set and may be determined based on the size of the facility (number of pathways and safeguard sets present). More iterations are typically utilized for random traversal.

Computing system 20 may execute the model numerous times during example analysis operations. For example, the computing system 20 may perform a given analysis where the values of the various input parameters including the system, scenario and run-time inputs do not change. The computing system 20 may perform a plurality of executions of the model during the analysis which are referred to as iterations of the given analysis. A statistically relevant number of iterations may be performed to provide information regarding the security risks of the facility (enable different types of analyses to be performed) as discussed further below. For example, in some embodiments, the adversary may randomly select a route of attack to the target in one iteration which differs from a route of attack to the target in another iteration. Executing a sufficient number of iterations increases the number of different combination of variables of the model which are executed providing respective different results which may be analyzed.

In addition, input parameters may be varied and used during other separate analyses. For example, following the execution of the model a sufficient number of iterations in a first analysis (i.e., using a fixed set of input parameters including system, scenario and run-time inputs), a second analysis may be performed where one or more of the parameters of the input parameters of the system, scenario and run-time inputs are varied and then executed in the model a sufficient number of iterations. Furthermore, any suitable number of individual analyses may be performed where respective fixed sets of the input parameters of the system, scenario and run-time inputs are used. The input parameters may be manually varied (e.g., an analyst inserts an additional safeguard to a pathway of a facility and executes the model to determine the effectiveness of the new safeguard) or varied automatically (e.g., the computing system varies the input parameters automatically to evaluate numerous different facility configurations and different attacks).

In one embodiment, summary statistics of executions of the model may be generated. One example summary statistic includes analysis statistics of the settings used for all iterations within same analysis including, for example, adversary skills, objective(s), and response times.

Another example summary statistic includes iteration statistics which summarizes the outcome for each iteration of an analysis, for example, scenario ID, iteration/repetition number and outcome (adversary win/lose), whether detection occurred or not, time of detection, response time and time of intercept (simulation time).

An additional summary statistic includes path which describes movement of adversary through the iteration including areas and pathways. For example, this information may include iteration/repetition number, current area, next area, pathway ID, safeguard set, and objective. A safeguard summary statistic may be provided which includes detailed information of safeguards encountered in each iteration including iteration/repetition number, safeguard set ID, specific safeguard, mode (speed/stealth), whether detection occurred or not, delay performance, detection performance, and response time remaining if adversary was successful.

In another embodiment, a detailed iteration analysis is provided which includes significant events to provide detailed information about the results of the iterations. Each event is listed by the simulation time they occur with the following information (where applicable depending on event): arrivals to area, attack vector changes (e.g., stealth/speed, cyber, cyber/physical, physical), move information from one area to another (e.g., path delays/time to move, safeguard set selected by adversary), action (e.g., type of action and action specific information: degrade safeguard (SG), set next area, etc.), engaging safeguards (e.g., current performance for detection and delay experienced), pass safeguards (e.g., current performance for delay, delay experienced, degrade safeguard as defined for each safeguard), detection probability outcome (e.g., change to speed mode when detected) and adversary (e.g., win/lose, interdiction location).

A sample of a detailed iteration analysis output is included as an example in Table C.

TABLE C

| Rep | Time | Actions | Add'l Info 1 | Add'l Info 2 |
|---|---|---|---|---|
| 1 | Time: 0 | Starting Area: Internet | Attack Vector: Cyber + Physical Approach: stealth | Skill Level: Physical - medium; Cyber - medium |
| 1 | Time: 0 | Arrived at Internet | | |
| 1 | Time: 0 | Moving from Internet to Facility Exterior | Baseline path delay of 0.5 minutes | Pathway 495; Safeguard set (1) selected |
| 1 | Time: 0.5 | Arrived at Facility Exterior | | |
| 1 | Time: 0.5 | Moving from Facility Exterior to Stair 2 | Baseline path delay of 0.5 minutes | Pathway 4; Safeguard set (1) selected |
| 1 | Time: 1 | Engage SG: Human Observation (6) | Detection probability of 10% @100% performance | |
| 1 | Time: 1 | Adversary DETECTED; (10%) Approach set to 'speed' | | |
| 1 | Time: 1 | Passed SG: Human Observation (6) | Delay of 0 minutes @100% performance | Degrade SG: Human Observation (6); Delay (−0%) Detect (−0%) |
| 1 | Time: 1 | Engage SG: Prox Card Reader (7) | Detection probability of 20% @100% performance | |
| 1 | Time: 1.75 | Passed SG: Prox Card Reader (7) | Delay of 0.75 minutes @100% performance | Degrade SG: Prox Card Reader (7); Delay (−100%) Detect (−100%) |
| 1 | Time: 1.75 | Arrived at Stair 2 | | |
| 1 | Time: 1.75 | Moving from Stair 2 to LAI | Baseline path delay of 0.5 minutes | Pathway 83; Safeguard set (4) selected |
| 1 | Time: 2.25 | Engage SG: Alerted Human Observation (33) | Detection probability of 30% @100% performance | |
| 1 | Time: 2.25 | Passed SG: Alerted Human Observation (33) | Delay of 0 minutes @100% performance | Degrade SG: Alerted Human Observation (33); Delay (−0%) Detect (−0%) |
| 1 | Time: 2.25 | Engage SG: Interior Door Glass Insert (34) | Detection probability of 0% @100% performance | |
| 1 | Time: 2.42 | Passed SG: Interior Door Glass Insert (34) | Delay of 0.17 minutes @100% performance | Degrade SG: Interior Door Glass Insert (34); Delay (−100%) Detect (−100%) |
| 1 | Time: 2.42 | Engage SG: Magnetic Door Switch (35) | Detection probability of 95% @100% performance | |
| 1 | Time: 2.42 | Passed SG: Magnetic Door Switch (35) | Delay of 0 minutes @100% performance | Degrade SG: Magnetic Door Switch (35); Delay (−0%) Detect (−0%) |
| 1 | Time: 2.42 | Arrived at LAI | | |
| 1 | Time: 2.42 | Moving from LAI to Conference 2 2511 | Baseline path delay of 0.5 minutes | Pathway 118; Safeguard set (19) selected |
| 1 | Time: 2.92 | Engage SG: Human Observation (50) | Detection probability of 10% @100% performance | |
| 1 | Time: 2.92 | Passed SG: Human Observation (50) | Delay of 0 minutes @100% performance | Degrade SG: Human Observation (50); Delay (−0%) Detect (−0%) |
| 1 | Time: 2.92 | Engage SG: Reinforced Interior Wall (51) | Detection probability of 0% @100% performance | |
| 1 | Time: 4.12 | Passed SG: Reinforced Interior Wall (51) | Delay of 1.2 minutes @100% performance | Degrade SG: Reinforced Interior Wall (51); Delay (−100%) Detect (−100%) |
| 1 | Time: 4.12 | Arrived at Conference 2 2511 | | |
| 1 | Time: 4.12 | Moving from Conference 2 2511 to Machine Room 2709 | Baseline path delay of 0.5 minutes | Pathway 350; Safeguard set (28) selected |
| 1 | Time: 4.62 | Engage SG: Human Observation (120) | Detection probability of 10% @100% performance | |
| 1 | Time: 4.62 | Passed SG: Human Observation (120) | Delay of 0 minutes @100% performance | Degrade SG: Human Observation (120); Delay (−0%) Detect (−0%) |
| 1 | Time: 4.62 | Engage SG: Reinforced Interior Wall (121) | Detection probability of 0% @100% performance | |
| 1 | Time: 5.82 | Passed SG: Reinforced Interior Wall (121) | Delay of 1.2 minutes @100% performance | Degrade SG: Reinforced Interior Wall (121); Delay (−100%) Detect (−100%) |
| 1 | Time: 5.82 | Arrived at Machine Room 2709 | | |
| 1 | Time: 5.82 | Moving from Machine Room 2709 to Cubicles 2719 | Baseline path delay of 0.5 minutes | Pathway 297; Safeguard set (72) selected |
| 1 | Time: 6.32 | Engage SG: Human Observation (110) | Detection probability of 10% @100% performance | |
| 1 | Time: 6.32 | Passed SG: Human Observation (110) | Delay of 0 minutes @100% performance | Degrade SG: Human Observation (110); Delay (−0%) Detect (−0%) |
| 1 | Time: 6.32 | Arrived at Cubicles 2719 | | |
| 1 | Time: 6.32 | Moving from Cubicles 2719 to Cubicles 2719 Safe | Baseline path delay of 0.5 minutes | Pathway 285; Safeguard set (64) selected |

TABLE C-continued

| Rep | Time | Actions | Add'l Info 1 | Add'l Info 2 |
|---|---|---|---|---|
| 1 | Time: 6.82 | Engage SG: Human Observation (107) | Detection probability of 10% @100% performance | |
| 1 | Time: 6.82 | Passed SG: Human Observation (107) | Delay of 0 minutes @100% performance | Degrade SG: Human Observation (107); Delay (−0%) Detect (−0%) |
| 1 | Time: 6.82 | Engage SG: Safe Enclosure (108) | Detection probability of 0% @100% performance | |
| 1 | Time: 8.82 | Passed SG: Safe Enclosure (108) | Delay of 2 minutes @100% performance | Degrade SG: Safe Enclosure (108); Delay (−100%) Detect (−100%) |
| 1 | Time: 8.82 | Arrived at Cubicles 2719 Safe | | |
| 1 | Time: 8.82 | Moving from Cubicles 2719 Safe to Cubicles 2719 | Baseline path delay of 0.5 minutes | Pathway 635; Safeguard set (62) selected |
| 1 | Time: 9.32 | Engage SG: Human Observation (154) | Detection probability of 10% @100% performance | |
| 1 | Time: 9.32 | Passed SG: Human Observation (154) | Delay of 0 minutes @100% performance | Degrade SG: Human Observation (154); Delay (−0%) Detect (−0%) |
| 1 | Time: 9.32 | Arrived at Cubicles 2719 | | |
| 1 | Time: 9.32 | Moving from Cubicles 2719 to VTR | Baseline path delay of 0.5 minutes | Pathway 267; Safeguard set (92) selected |
| 1 | Time: 9.82 | Engage SG: Human Observation (102) | Detection probability of 10% @100% performance | |
| 1 | Time: 9.82 | Passed SG: Human Observation (102) | Delay of 0 minutes @100% performance | Degrade SG: Human Observation (102); Delay (−0%) Detect (−0%) |
| 1 | Time: 9.82 | Arrived at VTR | | |
| 1 | Time: 9.82 | Moving from VTR to VTR Safe | Baseline path delay of 0.5 minutes | Pathway 180; Safeguard set (59) selected |
| 1 | Time: 10.32 | Engage SG: Human Observation (92) | Detection probability of 10% @100% performance | |
| 1 | Time: 10.32 | Passed SG: Human Observation (92) | Delay of 0 minutes @100% performance | Degrade SG: Human Observation (92); Delay (−0%) Detect (−0%) |
| 1 | Time: 10.32 | Engage SG: Safe Enclosure (93) | Detection probability of 0% @100% performance | |
| 1 | Time: 11.0 | Adversary Loses; Interdiction at VTR | | |

The output information resulting from the executions of the model may be mined and used in various different ways. In one example, the results may be queried or searched by an analyst, for example, to identify weaknesses in the security system, to identify relationships between physical and cyber security systems which were not previously apparent, to assist with the design/re-design of physical and cyber security systems and for other purposes. In particular, these example uses of the information which result from the executions of the model are illustrative and the information may be used differently in other embodiments.

More specific examples are set forth below to illustrate possible uses of the results of the executions of the model, however, it is understood that an analyst may use the results differently during the evaluation of different facilities having different physical and cyber architectures and/or for different purposes. In one example, an analyst may review the results of the number of iterations having successful attacks by an adversary versus the number of iterations when the adversary was neutralized to determine if the security provided is acceptable. In other examples, an analyst may perform frequency searching of the results (e.g., identify the most commonly used areas and pathways traversed by adversaries during iterations where the adversary successfully reached the target, identify the specific safeguard which was overcome by the adversary the greatest number of times during iterations when the adversary was neutralized, etc.).

In one example, a proposed security system of a facility to be built may be analyzed prior to construction in an effort to identify and improve weaknesses. Furthermore, existing facilities may be analyzed to assist with redesign of the facilities' security systems (e.g., identify weak points of the systems, model different possible revisions to the systems, and identify most effective revisions to determine appropriate changes for improvement to the weak points of existing security systems). A security system of a facility may be constructed or revised in accordance with the most effective physical and cyber architectures identified by the executions of the model.

As mentioned above, a plurality of iterations (e.g., thousands) may be performed during a given analysis of the model (i.e., execution of the model using a common set of inputs). Running numerous iterations may help an analyst identify edge or outlier cases, for example, when the adversary was successful and traversed a route of attack through both physical and cyber domains which was not previously appreciated by security personnel. This example execution of the model helps identify unknown risks and gain insight into the security system which was not previously recognized. More specifically, the electrical interconnections and system level interactions could provide an adversary an unexplored or unrealized path to the target. Execution of the model upon a facility may identify a previously-unidentified route of attack through one of the physical areas and one of the cyber areas to a target.

In one embodiment, the statistics for each iteration are captured in the output log for the analyst to review, and can be compiled across multiple iterations. Statistical analysis can be performed for each use case, and selected scenarios can be played back in a graphical user interface in one embodiment.

In one embodiment, the graphical user interface may display a graph, for example as shown in FIG. 1, and the relevant information during the execution of the model during an iteration (e.g., display event detection, response initiation, the path the adversary chooses, the safeguard being exploited, and the time involved with each event). In this example, the analysts can watch each step of the attack as they unfold or after the fact for iterations of interest.

Figure 3:
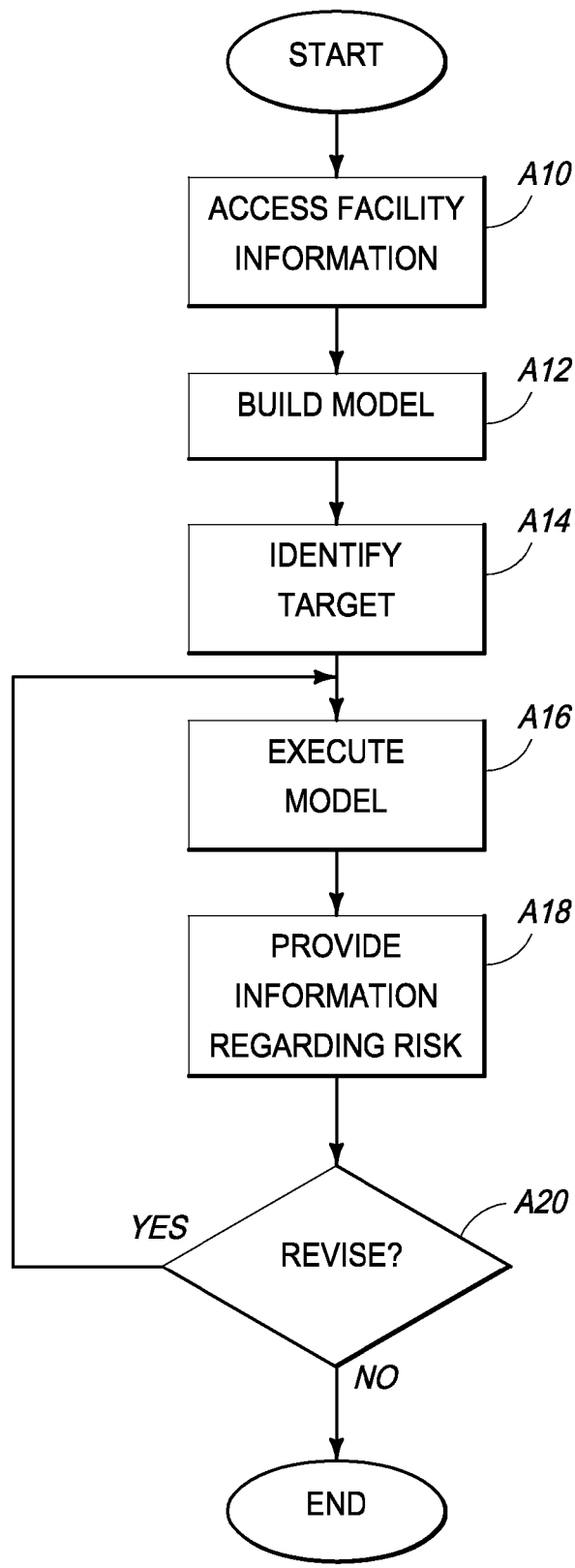
FIG. 3 is a flow chart of a method of executing a model according to one embodiment.

Referring to FIG. 3, one example computer-implemented method for evaluating security risk of a facility which is performed by processing circuitry of the computing system is shown according to one embodiment. Other methods including more, less and/or alternative acts may be utilized in other embodiments.

At an act A10, system, scenario and run-time inputs discussed above regarding a facility are received or accessed. The information includes details regarding a physical architecture and a cyber architecture of a facility in this described example and may be accessed via the communications interface and/or user interface.

At an act A12, the inputs are utilized to build a model of the facility for subsequent execution. For example, appropriate graphs, matrices and tables described above of the physical and cyber areas, pathways and safeguards may be constructed.

At an act A14, a target to be pursued by the adversary, such as an area of the facility, is identified. Different targets may be used in different analyses of the facility.

At an act A16, the model is executed using the received inputs. In one embodiment, the model may be executed a sufficient number of iterations to simulate attacks against the target by an adversary traversing areas of the physical and cyber domains to assist with evaluation of security risks of the facility.

At an act A18, the results of the execution may be utilized to provide information regarding the security risk of the facility with respect to the target. For example, the summary statistics and detailed iteration analysis may be stored, mined, searched and reviewed by an analyst.

At an act A20, it is determined whether another analysis should be run. For example, if one or more input parameters are desired to be varied, then the method returns to act A16 to execute the model using the new input parameters and provide additional information regarding the risk at act A18 with the new input parameters as well as the previous input parameters. If no revisions are desired, the method terminates.

Figure 4:
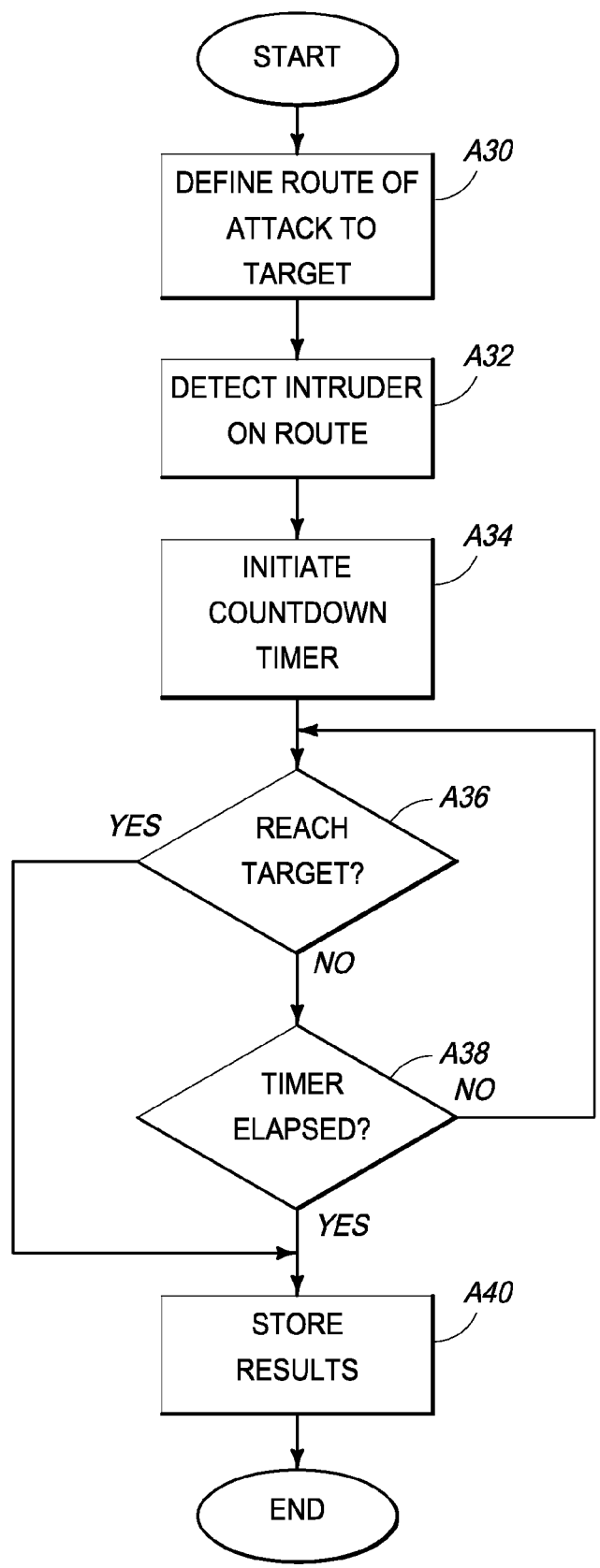
FIG. 4 is a flow chart of a method of executing an iteration of the model according to one embodiment.

Referring to FIG. 4, one example computer-implemented method for executing the model in an iteration by processing circuitry of the computing system is shown according to one embodiment. Other methods including more, less and/or alternative acts may be utilized in other embodiments.

At an act A30, the route of attack by the adversary is determined. The route may be predetermined or determined randomly during the execution of the model as mentioned previously.

At an act A32, the adversary is detected along the route of attack.

At an act A34, as a result of the detection of the adversary, a countdown timer is initiated. The countdown timer corresponds to an amount of time a response team has to attempt to neutralize the adversary after notification of the adversary before the adversary reaches the target.

At an act A36, it is determined whether the adversary has reached the target. If yes, the method proceeds to an act A40.

If not, the method proceeds to an act A38 where it is determined whether the countdown timer elapsed. If not, the process returns to act A36.

If yes, the method proceeds to act A40.

At act A40, the results of the whether the adversary reached the target or the countdown timer expired are stored. The adversary is considered to have "won" if the adversary reached the target and "lost" if the countdown timer elapses prior to the adversary reaching the target.

As described above, at least some embodiments of the disclosure permit analysis of a security system of a facility in both physical and cyber domains which provides a more complete and comprehensive security risk analysis of the facility compared with arrangements which analyze only one of the domains. The systems and methods of the disclosure can be used to explore interactions between both the physical and cyber domains and may assist with identifying vulnerabilities which were not previously readily apparent. In particular, an overall vulnerability analysis of the entire system may be performed taking into account previously unidentified and unaccounted for areas of physical/cyber interdependencies.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A computer-implemented security evaluation method comprising:

accessing information regarding a physical architecture and a cyber architecture of a facility;

building a model of the facility comprising a plurality of physical areas of the physical architecture, a plurality of cyber areas of the cyber architecture, and a plurality of pathways between the physical areas and the cyber areas;

identifying a target within the facility;

executing the model a plurality of times to simulate a plurality of attacks against the target by at least one adversary traversing at least one of the physical areas and at least one of the cyber areas;

using results of the executing, providing information regarding a security risk of the facility with respect to the target;

wherein individual executions of the model comprise initiating counting of a timer once the at least one adversary is detected; and wherein the providing comprises providing information indicating whether the at least one adversary reached the target during the executions of the model using information of the timer.

2. The method of claim 1 wherein the target comprises one of the physical and cyber areas.

3. The method of claim 1 wherein the building comprises building the model to comprise the pathways between different ones of the physical areas, between different ones of the physical areas and different ones of the cyber areas, and between different ones of the cyber areas.

4. The method of claim 1 further comprising specifying a route to the target, and wherein the executing comprises executing the model to simulate the attacks against the target by the at least one adversary traversing the route.

5. The method of claim 1 wherein the executing comprises executing the model to simulate the attacks against the target by the at least one adversary traversing different random routes to the target.

6. The method of claim 1 wherein the providing information comprises identifying a previously-unidentified route of attack through one of the physical areas and one of the cyber areas to the target.

7. The method of claim 1 further comprising, using the information regarding the security risk, generating a plurality of revised versions of the model, and wherein the executing comprises executing each of the revised versions of the model a plurality of times to simulate a plurality of additional attacks against the target by at least one adversary traversing a plurality of the physical and cyber areas.

8. The method of claim 7 further comprising, using the results of the executing, identifying one of the revised versions of the model for use in revising the facility.

9. The method of claim 1 wherein the pathways individually comprise at least one safeguard configured to at least one of detect and impede the at least one adversary.

10. The method of claim 1 wherein the providing information for one of the executions of the model comprises providing information indicating whether the at least one adversary reached the target before the timer counts a predetermined length of time.

11. The method of claim 10 wherein the at least one adversary is successful if the at least one adversary reaches the target before the timer counts the predetermined length of time and the at least one adversary is neutralized if the at least one adversary fails to reach the target before the timer counts the predetermined length of time.

12. The method of claim 1, after the executing, further comprising:
changing at least one variable of the model; and
after the changing, re-executing the model a plurality of times to simulate a plurality of additional attacks against the target by the at least one adversary traversing at least one of the physical areas and at least one of the cyber areas.

13. The method of claim 1 wherein the providing information comprises providing information regarding the number of executions of the model where the at least one adversary was successful in reaching the target.

14. The method of claim 1 wherein the different executions of the model provide different results due to different variables in the model.

15. A security evaluation system comprising:
an interface configured to receive information regarding a physical architecture and a cyber architecture of a facility; and
processing circuitry coupled with the interface and configured to:
build a model of the facility comprising a plurality of physical areas of the physical architecture and a plurality of cyber areas of the cyber architecture;
execute the model a plurality of times to simulate a plurality of attacks against the facility by at least one adversary traversing at least one of the physical areas and at least one of the cyber areas;
after the execution, revise the model a plurality of times generating a plurality of revised versions of the model; and
after the revision, execute each of the revised versions of the model a plurality of additional times to simulate a plurality of additional attacks against the facility by at least one adversary traversing at least one of the physical areas and at least one of the cyber areas.

16. The system of claim 15 wherein the model comprises a plurality of pathways intermediate the physical and cyber areas, and the pathways individually comprise at least one safeguard configured to at least one of detect and impede the at least one adversary, and wherein the revision of the model comprises changing the at least one safeguard of at least one of the pathways.

17. The system of claim 15 wherein the processing circuitry is configured to provide information regarding a security risk of the facility using the results of the executions of the model before and after the revision of the model.

18. The system of claim 17 wherein the information regarding the security risk of the facility compares the security risk of the facility with and without the revision.

19. An article of manufacture comprising:
non-transitory computer-readable storage medium comprising programming which causes processing circuitry to perform processing comprising:
accessing information regarding a physical architecture and a cyber architecture of a facility;
building a model of the facility comprising a plurality of physical areas of the physical architecture, a plurality of cyber areas of the cyber architecture, and a plurality of pathways between the physical areas and the cyber areas;
executing the model comprising:
identifying a target within the facility;
defining a route of attack by an adversary traversing at least one of the physical areas and at least one of the cyber areas to the target;
detecting the adversary on the route of attack;
as a result of the detecting, initiating a timer which counts a predetermined length of time; and
determining whether the at least one adversary reached the target before the predetermined length of time has been counted.

20. The article of manufacture of claim 19 wherein the route of attack is a user-specified route of attack.

21. The article of manufacture of claim 19 wherein the route of attack is a randomly determined route of attack.

* * * * *